US006116374A

United States Patent [19]

Westerbeke, Jr.

[11] Patent Number: 6,116,374

[45] Date of Patent: Sep. 12, 2000

[54] MOLDED SOUND ENCLOSURE, AND METHODS OF MAKING SAME

[75] Inventor: John H. Westerbeke, Jr., Milton, Mass.

[73] Assignee: Westerbeke Corporation, Avon, Mass.

[21] Appl. No.: 09/236,984

[22] Filed: Jan. 26, 1999

Related U.S. Application Data

[63] Continuation-in-part of application No. 08/946,037, Oct. 7, 1997, Pat. No. 5,929,394.

[51] Int. Cl.[7] ................................ F01N 1/00; B29D 9/00

[52] U.S. Cl. .......................... 181/204; 181/202; 264/45.7

[58] Field of Search .................................... 181/204, 202, 181/201; 52/264, 265, 270, 284, 79.1, 79.5, 79.9, 79.12; 264/45.1, 45.7

[56] References Cited

U.S. PATENT DOCUMENTS

| | | | |
|---|---|---|---|
| 3,534,828 | 10/1970 | Iver et al. . | |
| 3,729,889 | 5/1973 | Baruzzini . | |
| 3,924,597 | 12/1975 | Hatz et al. . | |
| 4,120,376 | 10/1978 | Palmer . | |
| 4,381,632 | 5/1983 | Geitner . | |
| 4,454,694 | 6/1984 | Davanture . | |
| 4,493,390 | 1/1985 | Pagano et al. . | |
| 4,649,667 | 3/1987 | Kitograd . | |
| 4,733,750 | 3/1988 | Poirier et al. . | |
| 4,836,123 | 6/1989 | Grinde et al. . | |
| 5,036,638 | 8/1991 | Kurtz, Jr. . | |
| 5,210,984 | 5/1993 | Eckel . | |
| 5,693,271 | 12/1997 | Johnson et al. | 264/45.7 |

*Primary Examiner*—Khanh Dang
*Attorney, Agent, or Firm*—Fish & Richardson P.C.

[57] ABSTRACT

An enclosure for enclosing sound-producing equipment (such as a marine propulsion system), the enclosure having first and second opposing end panels, first and second opposing side panels, a base and a top panel, releasably connected to each other at corresponding mitered edge joints. The method of making the enclosure includes molding a single enclosure preform and then severing the preform into side, end and top panels. The enclosure preform may be rotationally molded, for example, and may have a layer of sound absorbing material applied to its inner surface during molding. Other, non-molded sound enclosure embodiments are also disclosed.

18 Claims, 6 Drawing Sheets

MOLDED SOUND ENCLOSURE, AND METHODS OF MAKING SAME

CROSS-REFERENCE TO RELATED APPLICATIONS

This application is a continuation-in-part of my U.S. patent application Ser. No. 08/946,037, filed Oct. 7, 1997, now U.S. Pat. No. 5,929,394.

BACKGROUND OF THE INVENTION

This invention relates to molded enclosures for acoustically insulating sound-producing equipment.

In certain applications it is helpful to enclose a piece of noisy machinery, such as an engine or generator, with an enclosure to maintain a desired ambient noise level. The more completely enclosed the machinery, the better the sound attenuation. However, servicing the equipment is often hampered by full enclosures, the enclosure panels or other enclosure framework not allowing convenient and unobstructed access to all sides of the equipment.

SUMMARY OF THE INVENTION

The invention features an enclosure for acoustically insulating equipment enclosed thereby. The enclosure has a base, first and second opposing end panels, first and second opposing side panels, and a top panel. The side and end panels rest upon the base. The side panels are releasably connected to the end panels at mitered side edge joints, and the top panel is releasably connected to the end and side panels at corresponding mitered top edge joints. The top, side and end panels are each separately removable from the enclosure without removing any other of the panels.

The top, end and side panels are preferably constructed to be mutually self-supporting when releasably inter-connected to form the enclosure.

The top, side and end panels may be curved near the top and side mitered edge joints, such that the enclosure has rounded edges. Besides being aesthetically pleasing, such rounded edges help to reduce the chance of sharp corner injuries.

Some embodiments include latches to hold the top, side and end panels in an inter-connected condition. Each of the latches may include an elastomeric section arranged to be stretched to maintain compressive load across one of the top and side mitered edge joints.

In some cases, the enclosure is adapted to enclose a marine propulsion system.

In one aspect, the invention provides a method of forming such an enclosure, the method comprising the steps of molding an enclosure preform defining as-molded slots corresponding to each of the mitered top and side edge joints, and then severing the preform at the slots to form the side, end and top panels.

In some embodiments, the step of molding includes molding the preform to have recesses arranged in the top, side and end panels to receive latches for holding the top, side and end panels together.

In some cases, the step of molding includes molding the preform to have recesses arranged in the top, side and end panels to form molded handles for grasping during panel manipulation in use.

In some preferred embodiments, the method also includes, between the steps of molding and severing, the step of permanently adhering sound insulation material to an inside surface of the enclosure preform. The sound insulation material, which may have an open cell structure, forms an inner layer of each of the top, side and end panels.

In a presently preferred method, the step of molding comprises rotational molding of plastic resin in a reusable die to form an outer preform shell, and then rotational molding of sound insulation material on an inside surface of the outer preform shell.

In some embodiments, the method also includes the step of installing alignment pins at edges of one or more of the top, side and end panels which correspond to the top and side mitered edge joints.

The step of molding mal also include molding graphic on a face of the enclosure preform that corresponds to an outer surface of the sound enclosure.

According to another aspect, the method of forming enclosure comprises the steps of (1) forming the base and the top panel; (2) forming the first and second opposing end panels by molding a hollow end panel preform defining a slot about a perimeter thereof, and then severing the end panel preform along its slot to form the first and second end panels; (3) forming the first and second opposing side panels by molding a hollow side panel preform defining a slot about a perimeter thereof, and then severing the side panel preform along its slot to form the first and second opposing side panels; and then (4) arranging the base and top, side and end panels to form the enclosure, with the side and end panels interconnected along severed edges.

The steps of molding may include molding the hollow side and end panel preforms to have recesses arranged in the side and end panels to receive latches for holding the side and end panels together, or to form molded handles for grasping during panel manipulation in use.

In some embodiments, the method includes the step of permanently adhering sound insulation material to inside surfaces of the hollow side and end panel preforms, the sound insulation material (which may be of an open cell structure) forming an inner layer of each of the side and end panels.

The molding steps may include rotational molding of plastic resin in corresponding, reusable side and end panel dies and may include, after the rotational molding of plastic resin in the side and end panel dies to form respective side and end panel outer preform shells, rotational molding of sound insulation material on inside surfaces of the outer preform shells.

According to another aspect, the invention provides an enclosure for acoustically insulating equipment enclosed thereby. The enclosure includes a base, first and second opposing end panels resting upon the base, first and second opposing side panels resting upon the base and releasably connected to the end panels at mitered side edge joints, a top panel releasably connected to the end panels and the side panels at corresponding mitered top edge joints, and latches arranged to hold the top, side and end panels in an inter-connected condition. The top, side and end panels each have severed edges at which they were previously joined together in an as-molded condition.

Some embodiments of the enclosure include compliant gasket material (which may comprise a closed cell foam) held in compression in the top and side mitered edge joints.

In some cases, the top, side and end panels each have an outer shell of rigid plastic. Preferably, the top, side and end panels each also have an inner layer of sound absorbing material permanently adhered to an inner surface of the outer shell.

Each of the mitered edge joints may define a joint plane along which two of the top, end and side panels join in mating engagement. In some cases, each of the two joining panels is substantially planar and their joint plane intersects the planes of each of the two joining panels at miter angles of about 45 degrees.

At least one of the joining panels may have a guide pin extending through the joint plane for aligning the two joining panels.

In some embodiments, the top, side and end panels are curved near the top and side mitered edge joints, such that the enclosure has rounded edges.

The top, end and side panels may together define molded recesses arranged to receive the latches, and/or may each define molded handles arranged for grasping during panel manipulation.

In some presently preferred embodiments, the enclosure is adapted to enclose a marine propulsion system.

The enclosure can provide advantages in equipment serviceability, as it enables full, unobstructed access to any side of the enclosed equipment. All panels are removable, and any one panel may be removed without disturbing the others. Panel removal requires no tools.

Molding the enclosure panels, either all together in a single preform, or opposing pairs of panels in separate preforms, can provide lower overall product costs and reduced product complexity. In addition, plastic panels advantageously withstand some corrosive environments better than sheet metal panels. Insulation can be readily applied to the inner surfaces of the molded preforms before the preforms are severed into individual panels. The cutting groove arrangement allows the preforms to be cut into finished panels without creating severed edges visible from the outside of the finished enclosure.

In addition, the configuration of the mitered edge joints enables compression loading in use across all joints, thus providing low transmissibility of airborne sound through the joints. This angled edge construction also allows the enclosure to be readily produced in a relatively simple die. Other advantages will also be understood by those skilled in the art.

DESCRIPTION OF EMBODIMENTS

Figure 1:
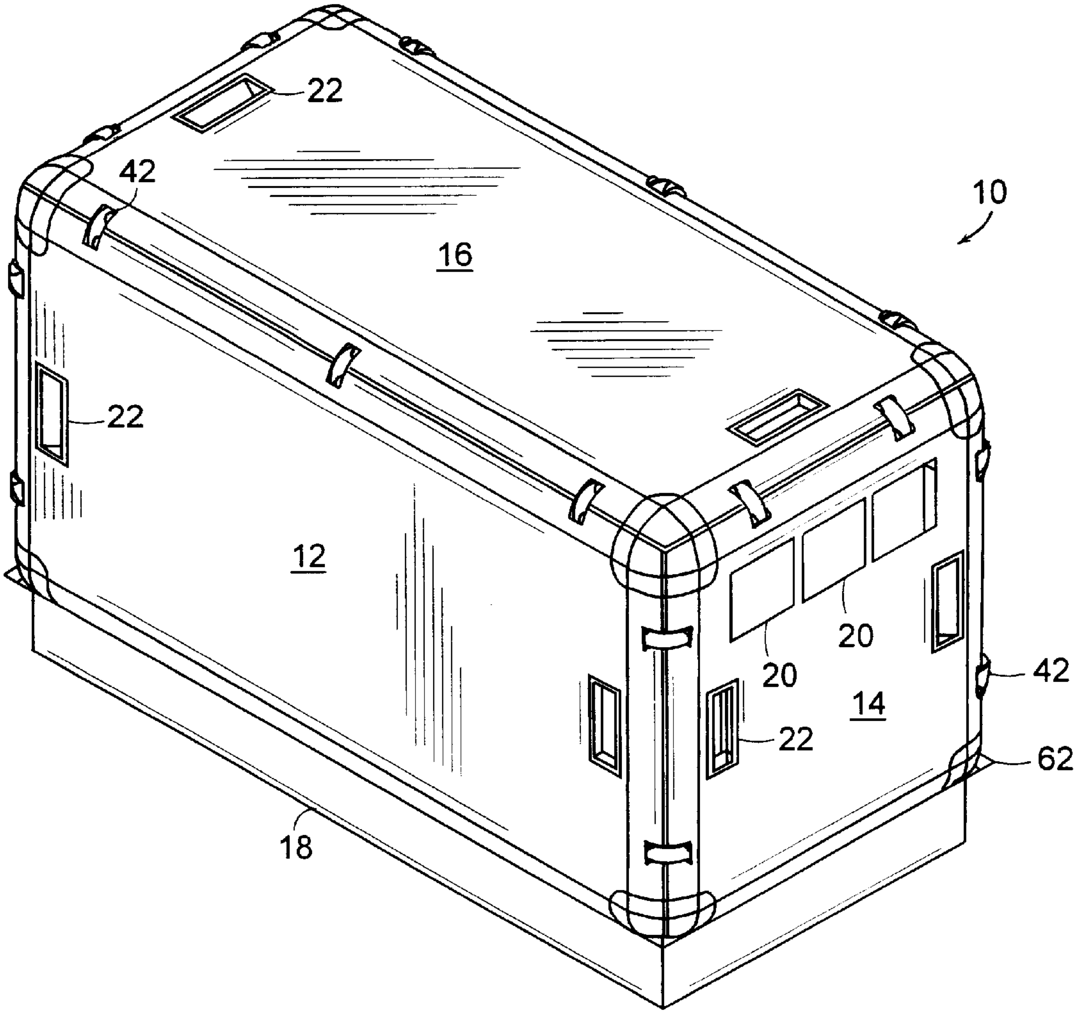
FIG. 1 is a perspective view of a sound enclosure.

Referring to FIG. 1, sound enclosure 10 includes two side panels 12, two end panels 14, a top panel 16, and a base 18. Shown fully assembled, enclosure 10 effectively surrounds and acoustically isolates sound-producing equipment, such as a gas or diesel engine and/or generator. Air circulation vents 20 are provided in end panels 14, which are preferably shrouded on the inside of the enclosure to form a labyrinth passage to reduce airborne noise through the vents, as is known in the art. Any necessary electrical and fluid lines (not shown) to and from the interior of the enclosure are preferably routed through base 18. The panels and base are 16 gauge sheet steel. Each panel 12, 14 and 16 has two opposing handles 22 and may be formed from a single piece of sheet metal, without welding or seaming, due to the of the edges and corners of the planar panels. Each panel includes four corner pieces 24, one at each corner.

Figure 2:
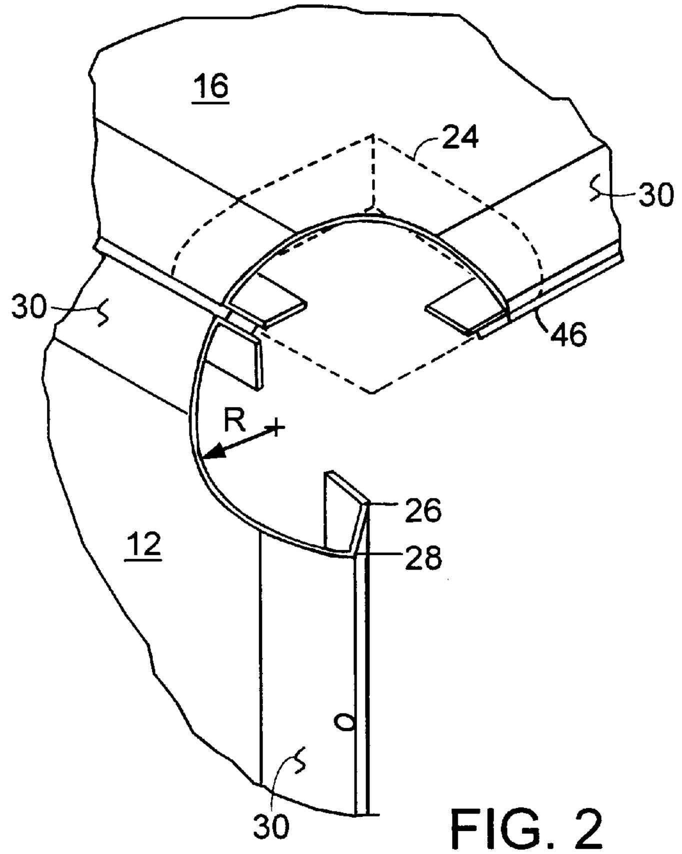
FIG. 2 is a partial cutaway view of a corner of the sound enclosure with one panel and one corner piece removed.

Referring also to FIG. 2, which shows one of the corners of enclosure 10 with end panel 14 and the corner piece of side panel 12 removed, and corner piece 24 of top panel 16 shown only in dashed outline, the panels are each bent along their edges. Each panel corner is notched, with a generous inner radius R, and the edges of the panel are then bent, as with a sheet metal brake, to form two sharp bends 26 and 28 and a gentle arc in the outer regions 30 of the panel near bends 28. The only other metal work involved in the construction of the panels is punching out holes for handles and mounting hardware (typically before bending).

Figure 3:
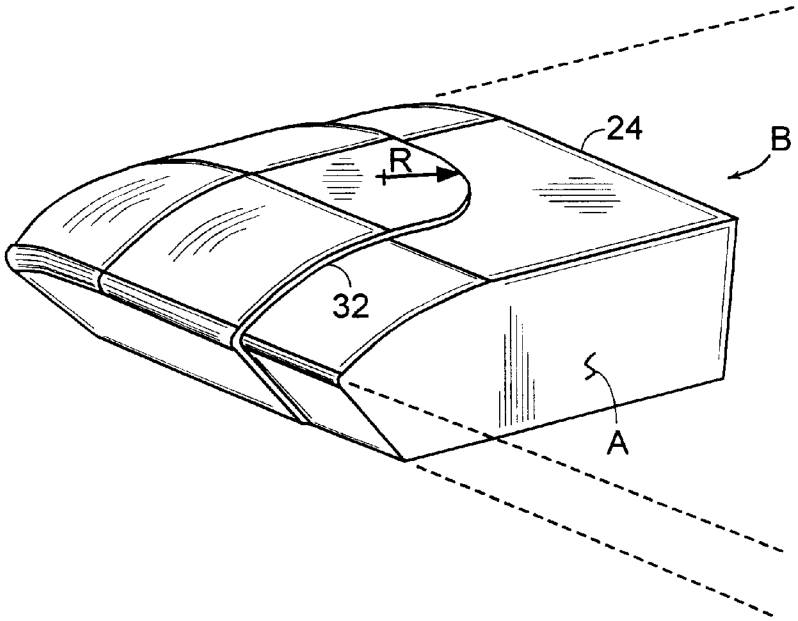
FIG. 3 is a perspective view of a corner piece.

Referring to FIG. 3, a corner piece 24 is shown in solid lines, with the outline of its corresponding sheet metal panel shown as dashed lines. Corner pieces 24 may be formed of molded plastic, such as blow-molded polyethylene. A ridge 32 of about 0.070 inch forms a lip for abutting the edges of the notched corner of the sheet metal for a smooth outer surface. Ridge 32 is radiused on the upper face of the corner piece to match the radius R of the notch. The two exposed sides of corner piece 24 are beveled at about a 45 degree angle to its upper and lower faces to match the bevels formed by bending the sheet metal panel. Each corner piece 24 is snapped into the notched corner of a panel such that sides A and B extend into the interior channels formed by the bent edges of the panel.

Figure 4:
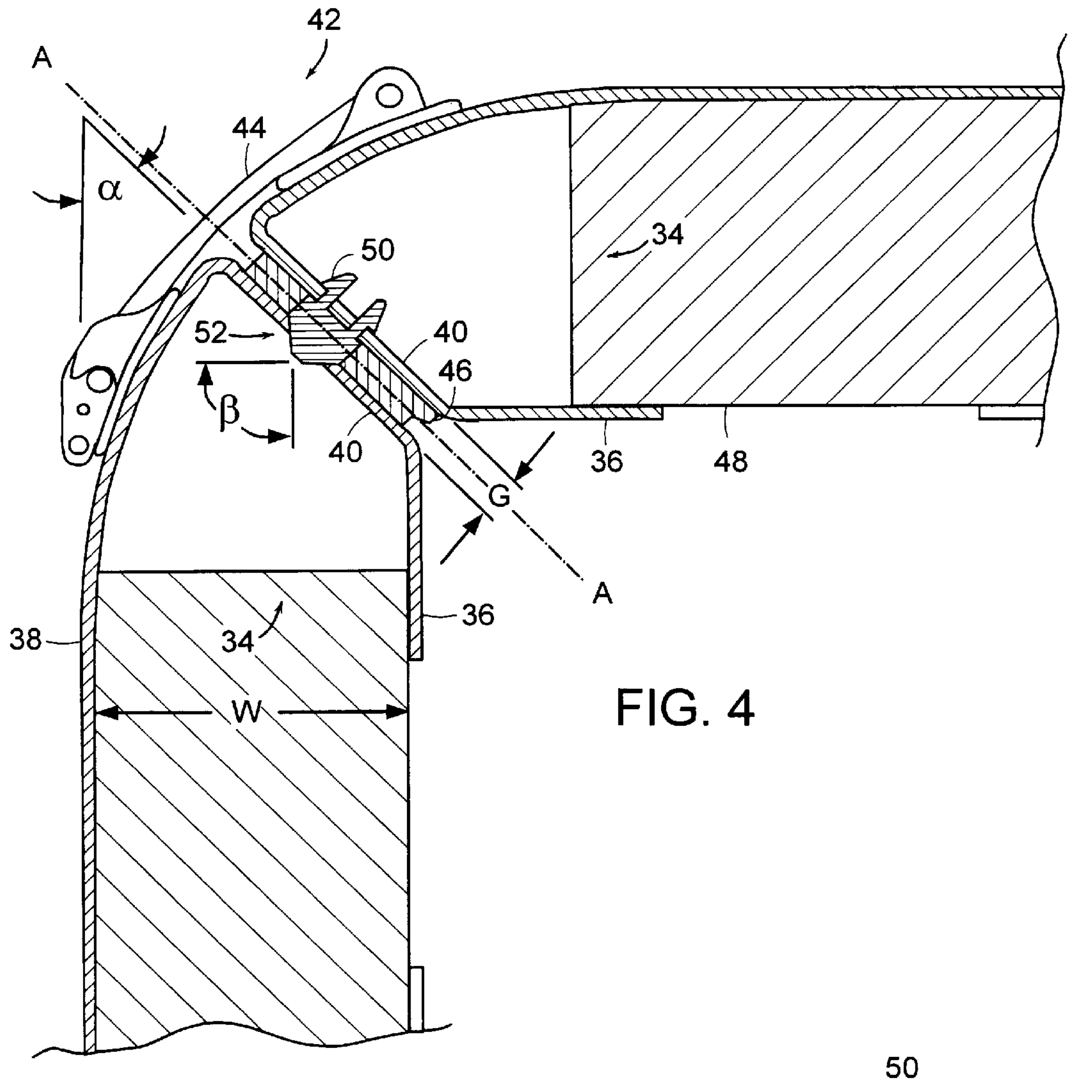
FIG. 4 is a cross-section view through an edge joint of the enclosure.

A section view through a joint between two typical panels, as assembled, is shown in FIG. 4. This figure is the same for either a side/end panel joint (a vertical joint between a side panel and an end panel) or a top panel joint (a horizontal joint between the top panel and another panel). The two panels meet at a joint plane, indicated by line A—A. The width W of the interior edge channels 34 extending along the sides of each panel between the channel lip 36 and the panel face 38 is about 0.9 inch. The bent panel edge forms a joint face 40 which is bevelled at an angle $\alpha$ of about 45 degrees to the panel face 38 (i.e., the edges of the panels are mitered). A latch 42 for holding the joint together has an elastomeric portion 44 which is stretched to keep the two panels of the joint held together with some nominal compression between their joint faces 40. Latches of this type are common as truck hood latches, for instance.

A gasket 46 is provided on one of the two joint faces 40 at each joint, to improve noise suppression. The panels are bent such that the nominal gap G at each joint is about 0.125 inch with latches 42 secured. Gasket 46 is a strip of closed cell foam, such as is commercially available as home weatherstripping, with an uncompressed thickness of about 0.188 inch. Other gasket materials may also be used, and should be compliant and have good elastomeric memory. Compressed by the load between the two panels, gasket 46 provides an effective joint seal against airborne noise radiating through the joint, and also cushions the panels against rattles.

Interior edge channels 34 retain semi-rigid sound-absorbing insert panels 48 in each sheet metal panel. Channel lips 36 overlap the edges of the insert panels to hold them in place. Spray adhesive between panel face 38 and insert panel 48 may be added for extra retention. Semi-rigid panels 48 are preferably selected from materials known to be good sound absorbers, such as open cell foams, and should be compliant enough to be deformed for insertion into channels 34.

Figure 5:
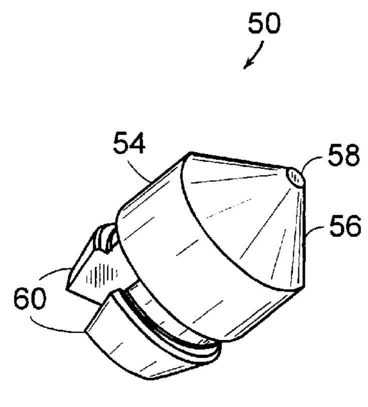
FIG. 5 is a perspective view of a guide pin.

Referring also to FIG. 5, guide pins 50 at each edge joint help to align the joining panels during assembly. Pins 50 may be molded of a polymer, such as nylon, polyacetal ("DELRIN") or polypropylene, and are designed to be snapped into place in corresponding punched holes in the joint faces 40 of the panels. Mating holes 52 are provided in joint faces 40 to receive the tapered ends of pins 50. Pins 50 have a cylindrical section 54 and a conical end 56 with a blunt tip 58 and an included tip angle β of about 90 degrees (FIG. 4). Opposing fingers 60 with radially projecting cam surfaces provide a snap fit with the edges of the pin mounting holes. Preferably, at least two guide pins are employed per edge joint.

To remove top panel 16 from the enclosure, the latches 42 connecting the top panel to all other panels are released. Grasping handles 22 (FIG. 1), the top panel may be pulled directly upward, away from the other panels, due to conical section 56 of guide pins 50 (FIG. 5). With top panel 16 removed, the remaining panels and base retain their relation and structure, and there is no obstructing enclosure framework above the enclosed equipment to interfere with servicing the equipment. As top panel 16 is set back in place, guide pins So align the top panel with the side and end panels without disturbing the position of the panels already in place.

Similarly, each of the side and end panels may be individually removed without disturbing any of the other panels. Due to the small V-shaped trough 62 in which the side and end panels rest upon base 18 (FIG. 1), the top edges of the side or end panel is typically tipped outward and the panel then lifted slightly to clear the lip of trough 62. Otherwise, the removal and replacement of a side or end panel is the same as for the top panel, and provides clear access to any side of the enclosed equipment without obstruction of enclosure framing. The inner side of the V-shaped trough of the base forms a mitered edge joint with the joint faces of the bottom sides of the side and end panels.

The angled joint faces 40 (FIG. 4), in combination with compliant gasket material 46, provides good sound absorption at the enclosure joints and also allows each panel to be removed without either panel sliding across the face of the gasket. The separation at the gasket interface is therefore clean and less likely to damage the gasket material with repetition.

Figure 6:
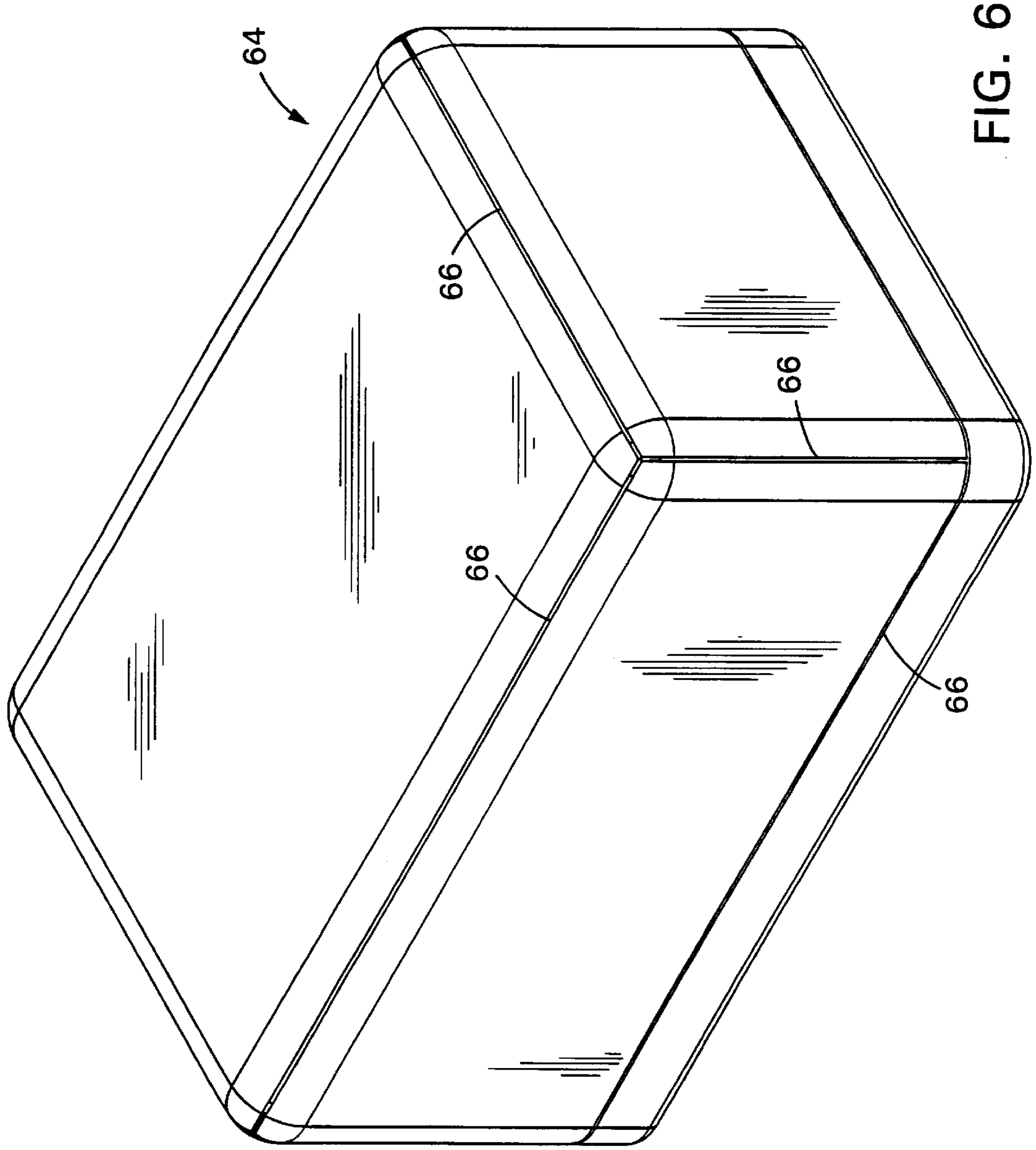
FIG. 6 is a perspective view of a blow-molded sound enclosure preform.
Figure 7:
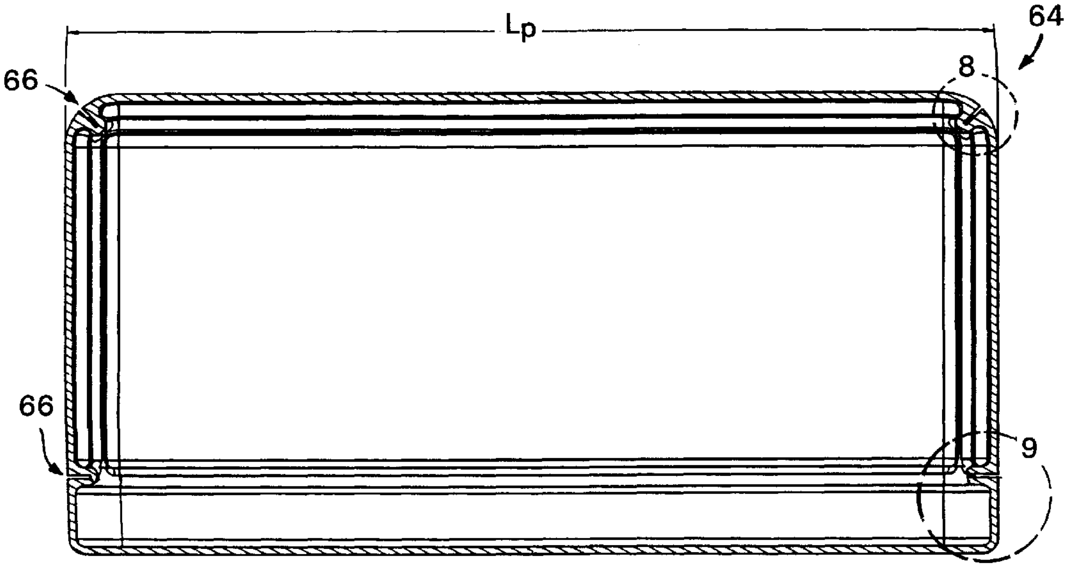
FIG. 7 is a cross-sectional view taken along line 7—7 in FIG. 6.
Figure 8:
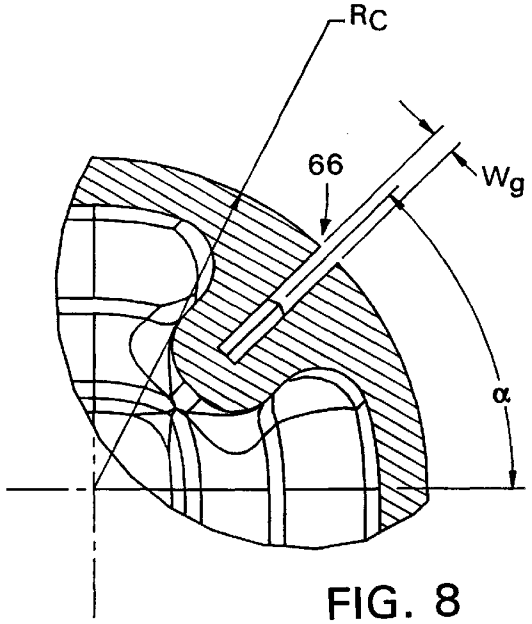
FIGS. 8 and 9 are enlarged views of Areas 7 and 8, respectively, in FIG. 7.

The structural components of a useful sound enclosure of the form shown in FIG. 1 can also be molded of plastic, as will be understood from the embodiment illustrated in FIGS. 6–8.

Referring first to FIG. 6, a molded enclosure preform 64 is a practically enclosed shell having six sides which correspond to the base, top, side and end panels of a finished enclosure. Molded as a single, contiguous unit, the molded enclosure preform is subsequently severed along grooves 66 that correspond to the inter-panel joint planes of the finished enclosure, producing six separate structural components without significant material waste. As shown, three grooves 66 intersect at each upper corner of the preform. Although the dimensional variance between preforms is generally low enough that like panels of enclosures thus formed are interchangeable, cutting all of the panels from a single preform insures that cutting variations or post-molding dimensional changes will not affect inter-panel fit.

Referring to FIG. 7, in this example the rigid plastic preform shell has a length $L_p$ of about 30 inches, corresponding to the overall length of the finished enclosure, and a nominal wall thickness, t (FIG. 9), of about 0.25 inch. As will be understood by those of skill in the art of rotational molding techniques, preform 66 is of a configuration suitable for rotational molding in a reusable die, grooves 66 being formed by appropriate sliding die elements which are retracted for demolding. Other molding techniques, such as blow-molding, may also be employed.

Figure 9:
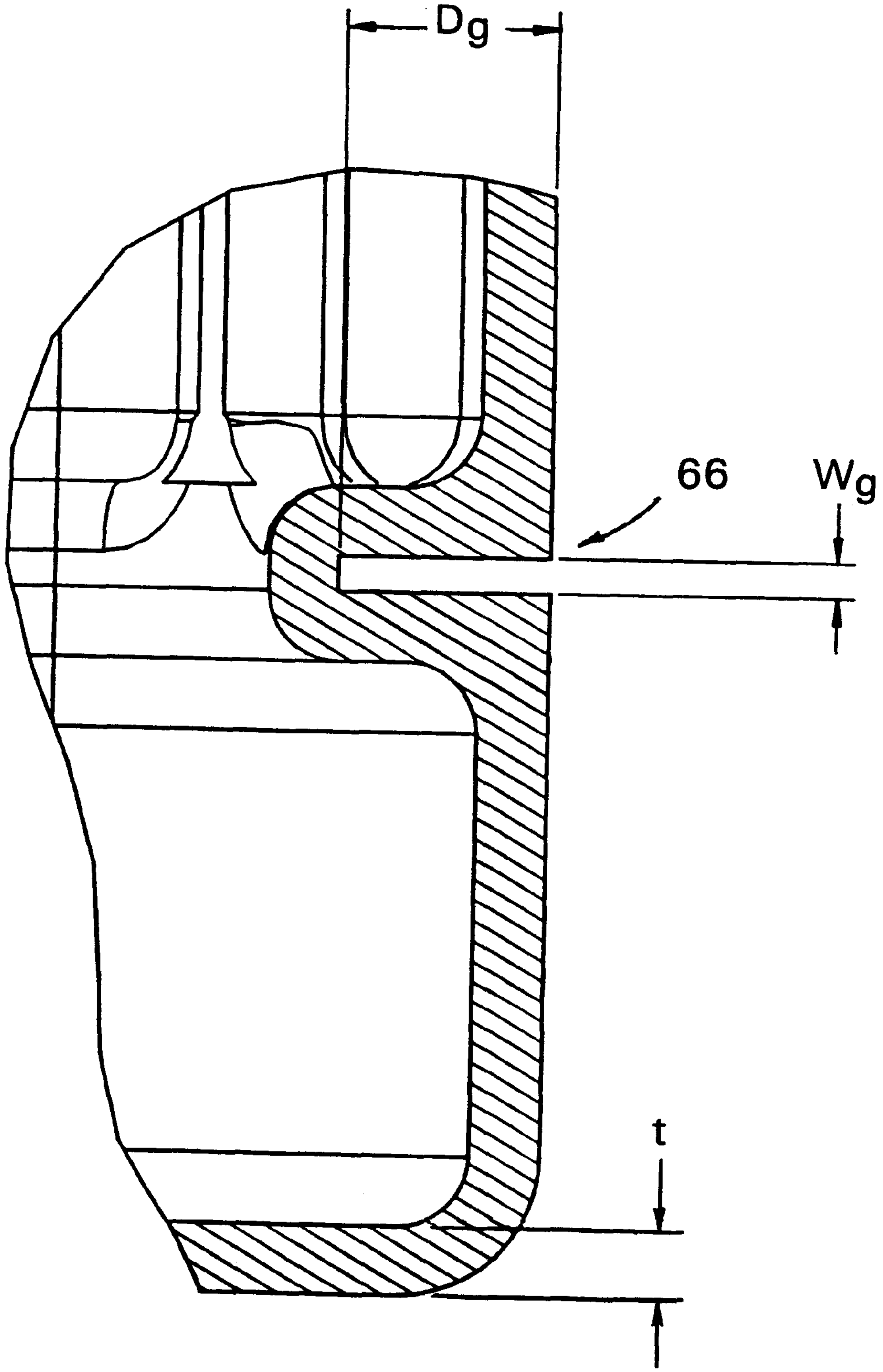

As shown in FIGS. 8 and 9, molded grooves 66 have a width $w_g$ corresponding to the width of the nominal gap between panels in the assembled enclosure (e.g., gap G of FIG. 4). In this instance, $w_g$ is nominally 0.13 inch, and the top corner radius $R_c$ is nominally 1.75 inches. The mating panel portions of the preform are joined, as molded, at the roots of grooves 66, as shown. To sever individual panels from the preform, a blade is inserted through grooves 66 to cut through the roots of the grooves, forming severed edges at the roots of the grooves. Subsequently, the severed edges may be trimmed as needed. Gasket strips are applied to opposing side walls of the molded grooves, and the panels re-assembled to form the enclosure. The thickness of the gasket strips is selected such that the combined thickness of the gaskets, under compression applied by the latches holding the panels together, is approximately the same as the original width of the grooves. Because the severed edges are spaced away from the outer surfaces of the assembled enclosure (the depth $D_g$ of the grooves is nominally 0.75 inch in this instance), they do not detract from the aesthetic appearance of the assembled product.

Preferably, an acoustically insulating material (not shown) is applied to the inside surfaces of the preform before the preform is cut into panels. Employing rotational molding techniques, the outer rigid plastic shell is formed with a first shot of plastic, and an open cell material is deposited on the inside of the shell as a second shot, before removing the preform from the mold. Thus applied, the insulating material becomes permanently bonded to each panel, eliminating the need for subsequent attachment. If desired, however, the inner insulating material may be omitted.

Figure 10:
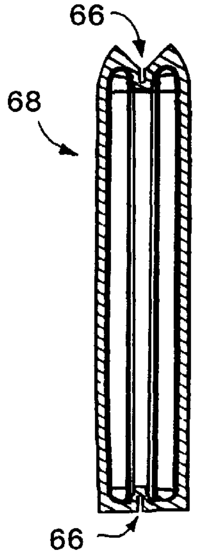
FIG. 10 is a cross-section of a molded end panel preform.

For molding very large enclosures, or to reduce the size of the molding dies, pairs of opposing panels may be molded together in a single preform and then assembled to form an enclosure. For example, FIG. 10 is a cross-section of a molded end panel preform 68 from which can be cut a pair of opposing end panels. A single cutting groove 66 extends about the perimeter of the relatively thin, flat preform. Cutting along the groove separates the preform into left and right end panels of a single enclosure. Similarly, the two opposing side panels may be formed as a single side panel preform (not shown), and the top panel and base may be molded together as a single preform. Thus, the enclosure may be molded in three smaller dies, rather than in one die defining an enclosure-sized cavity. As with the full-size preform of FIGS. 6–9, such "pancake" preforms may also be lined with insulating material during the rotational molding process.

Molding enables handles, latch recesses or attachment bosses, grips or other features to be integrally formed in the preform, reducing assembly costs and complexity. In addition, graphic indicia logos or equipment servicing instructions may be molded into the outer faces of the preform.

The enclosures disclosed herein are especially suitable for enclosing engines, generators and propulsion systems, such as in marine applications. The size and shape of the enclosure can be chosen to enclose a particular piece of equipment while applying the principles and concepts discussed above.

The base of the enclosure (e.g., 18 in FIG. 1) may have a solid center or may be an open, four-sided frame adapted to be lowered over a mounted engine. An important feature of the base is that it provide means for receiving the lower edges of the side and end panels such that the assembled enclosure fully surrounds any otherwise open sides of the equipment.

Other embodiments and features will also fall within the scope of the following claims.

What is claimed is:

1. A method of forming an enclosure for enclosing sound-producing equipment, the enclosure comprising first and second opposing end panels adapted to rest upon a base;

first and second opposing side panels adapted to rest upon the base and releasably connected to the end panels at mitered side edge joints; and a top panel releasably connected to the end panels and the side panels at corresponding mitered top edge joints;

the method comprising the steps of molding an enclosure preform defining as-molded slots corresponding to each of said mitered top and side edge joints;

severing the preform at said slots to form said side, end and top panels.

2. The method of claim 1 wherein the step of molding includes molding the preform to have recesses arranged in the top, side and end panels to receive latches for holding the top, side and end panels together.

3. The method of claim 1 wherein the step of molding includes molding the preform to have recesses arranged in the top, side and end panels to form molded handles for grasping during panel manipulation in use.

4. The method of claim 1 further comprising, between the steps of molding and severing, the step of permanently adhering sound insulation material to an inside surface of the enclosure preform, the sound insulation material forming an inner layer of each of the top, side and end panels.

5. The method of claim 4 wherein the sound insulation material is of open cell structure.

6. The method of claim 1 wherein the step of molding comprises rotational molding of plastic resin in a reusable die.

7. The method of claim 6 further comprising, after the rotational molding of plastic resin to form an outer preform shell, rotational molding of sound insulation material on an inside surface of the outer preform shell, the sound insulation material forming an inner layer of each of the top, side and end panels.

8. The method of claim 7 wherein the sound insulation material is of open cell structure.

9. The method of claim 1 further comprising the step of installing alignment pins at edges of any of said top, side and end panels, the edges corresponding to said top and side mitered edge joints.

10. The method of claim 1 wherein the step of molding includes molding graphic indicia on a face of the enclosure preform that corresponds to an outer surface of the sound enclosure.

11. A method of forming an enclosure for enclosing sound-producing equipment, the enclosure comprising a base;

first and second opposing end panels adapted to rest upon the base;

first and second opposing side panels adapted to rest upon the base and releasably connected to the end panels at mitered side edge joints; and a top panel releasably connected to the end panels and the side panels at corresponding mitered top edge joints;

the method comprising the steps of:

forming the base and the top panel;

forming the first and second opposing end panels by molding a hollow end panel preform defining a slot about a perimeter thereof, and severing the end panel preform along its slot to form the first and second opposing end panels;

forming the first and second opposing side panels by molding a hollow side panel preform defining a slot about a perimeter thereof, and severing the side panel preform along its slot to form the first and second opposing side panels; and arranging the base and top, side and end panels to form an enclosure with the side and end panels interconnected along severed edges.

12. The method of claim 11 wherein the steps of molding include molding the hollow side and end panel preforms to have recesses arranged in the side and end panels to receive latches for holding the side and end panels together.

13. The method of claim 11 wherein the steps of molding include molding the hollow side and end panel preforms to have recesses arranged in the side and end panels to form molded handles for grasping during panel manipulation in use.

14. The method of claim 11 further comprising the step of permanently adhering sound insulation material to inside surfaces of the hollow side and end panel preforms, the sound insulation material forming an inner layer of each of the side and end panels.

15. The method of claim 14 wherein the sound insulation material is of open cell structure.

16. The method of claim 11 wherein the steps of molding comprise rotational molding of plastic resin in corresponding, reusable side and end panel dies.

17. The method of claim 16 further comprising, after the rotational molding of plastic resin in said side and end panel dies to form respective side and end panel outer preform shells, rotational molding of sound insulation material on inside surfaces of the outer preform shells, the sound insulation material forming an inner layer of each of the side and end panels.

18. The method of claim 17 wherein the sound insulation material is of open cell structure.

* * * * *

UNITED STATES PATENT AND TRADEMARK OFFICE

CERTIFICATE OF CORRECTION

PATENT NO. : 6,116,374

DATED : September 12, 2000

INVENTOR(S) : John H. Westerheke, et. al.

It is certified that error appears in the above-indentified patent and that said Letters Patent is hereby corrected as shown below:

Column 2, line 13, change "mal" to --may--;

Column 2, line 13, after "graphic" insert --indicia--;

Column 2, line 21, after "second" insert --opposite--;

Column 4, line 10, after "due to the" insert --construction--;

Column 5, line 30, after "pins" change "so" to -50-.

Signed and Sealed this

Tenth Day of April, 2001

Attest:

Nicholas P. Godici

NICHOLAS P. GODICI

*Attesting Officer* *Acting Director of the United States Patent and Trademark Office*